Patented June 28, 1932

1,865,228

UNITED STATES PATENT OFFICE

EDWIN O. BARSTOW, OF MIDLAND, MICHIGAN, ASSIGNOR TO THE DOW CHEMICAL COMPANY, OF MIDLAND, MICHIGAN, A CORPORATION OF MICHIGAN

METHOD OF PREPARING ANHYDROUS MAGNESIUM CHLORIDE FROM MAGNESIUM OXYCHLORIDE CEMENT MIXTURES

No Drawing. Application filed May 6, 1929. Serial No. 360,994.

The present invention relates, as indicated, to the preparation of anhydrous magnesium chloride from magnesium oxychloride cement mixtures, i. e., from the solid reacted material obtained by compounding caustic magnesia with a water solution of magnesium chloride.

Natural brines containing magnesium chloride are at present the chief source of anhydrous magnesium chloride to the preparation of which much effort has been directed. It is, however, desirable to augment the source of this valuable salt and the present invention has as one object the provision of a method for deriving anhydrous magnesium chloride from magnesia and hydrochloric acid in whole or in part. Other objects will appear as the description proceeds.

To the accomplishment of the foregoing and related ends, the invention, then, consists of the steps hereinafter fully described and particularly pointed out in the claims, the following description setting forth in detail several modes of carrying out the invention, such disclosed modes illustrating, however, but several of various ways in which the principle of the invention may be used.

I mix caustic magnesia and a water solution of magnesium chloride to form a hardening cement whereby magnesium oxychloride is formed. The exact composition of such oxychloride has not as yet been determined, but its formula or exact composition is immaterial to the working or practice of my invention. The compound

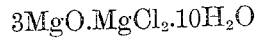
$3MgO.MgCl_2.10H_2O$ has been reported as formed under certain conditions and an oxychloride corresponding to MgOHCl is known. It is also believed that magnesium hydroxide may be present as a reaction product in such cement.

Caustic magnesia is that form of MgO, whether derived by calcining magnesite or otherwise, which will react with $MgCl_2$ and water to form a cement.

Many such mixtures may be made which will set to a solid in due course, some promptly, others more slowly, but any such mixture which will set to a solid in a reasonable period of time and permit treatment in the later steps will be usable in my method.

In order to facilitate the subsequent procedure the solid product will be reduced to granular or divided form and the particles thereof will preferably be of approximately uniform size. The plastic mixture may, therefore, be stirred during setting to produce a granular condition, or it may be cast or molded into conveniently sized or shaped blocks, slabs, or other forms, and then be crushed or broken up after having set. In order to provide a fairly uniform size of particle the granulated or otherwise divided material may be screened in well understood manner, the oversize, if any, being returned for further crushing or equivalent method of subdivision, the fines being returned to a subsequent plastic mix for incorporation therein. There is thus obtained a divided form of magnesium oxychloride cement of a graded, sized character suited to the subsequent treatment.

The so prepared divided oxychloride is then preferably dried as in a current of hot air of the products of combustion of fuel, preferably in a continuous manner as in a rotary kiln type of dryer or other form adapted to evaporate excess water to such degree as will result in an overall economy of heat in the entire process. Any fines produced in such drying step may be returned for use in preparing subsequent plastic mixes and are thus eliminated from the later step of conversion to the anhydrous chloride, if such small sized particles interfere unduly therein.

The so dehydrated cement is then reacted with substantially dry hydrochloric acid gas while heat is supplied to the reactants whereby the water formed in the reaction is evolved as vapor. Treatment in a current of gas is preferable, but the treatment may be either in batches, i. e., intermittent, or continuous as desired. The reaction taking place is one in which the magnesium combines with the chlorine of the acid gas to form magnesium chloride, and the OH content of the oxychloride combines with the hydrogen thereof to form water.

A typical reaction may be written thus:—

$$MgOHCl + HCl \rightarrow MgCl_2 + H_2O \text{ (vapor)}.$$

The conditions under which the water will be evolved as vapor rather than remain as crystal water in combination with the chloride formed may be determined by inspection of the following table, in which are listed opposite various temperatures from 190° to 280° C. inclusive, the partial HCl, water vapor, and total dissociation pressures of $MgCl_2 \cdot H_2O$ and in the last column the molecular ratio of $HCl/H_2O$ in the atmosphere in equilibrium with such hydrated chloride at the stated temperatures.

*Dissociation pressures of $MgCl_2 \cdot H_2O$*

| Temperature °C. | Partial pressure HCl in mm. of Hg | Partial pressure H₂O in mm. of Hg | Total dissociation pressure in mm. of Hg | Molecular ratio HCl/H₂O |
|---|---|---|---|---|
| 190 | 21.5 | 9.2 | 39.7 | 2.34 |
| 200 | 31.5 | 13.5 | 45.0 | 2.33 |
| 210 | 46.0 | 19.5 | 65.5 | 2.36 |
| 220 | 67.0 | 28.5 | 95.5 | 2.35 |
| 230 | 95.0 | 41.0 | 136.0 | 2.32 |
| 240 | 138.0 | 58.0 | 196.0 | 2.38 |
| 250 | 198.0 | 83.0 | 281.0 | 2.38 |
| 260 | 278.0 | 116.0 | 394.0 | 2.39 |
| 270 | 380.0 | 165.0 | 520.0 | 2.30 |
| 280 | 520.0 | 230.0 | 750.0 | 2.26 |
| Average ratio | | | | 2.34 |

Treating the dried product with HCl gas under pressure conditions below the tabular values at the corresponding temperatures, the above reaction, which will in general take place at practically all temperatures, will evolve the water formed as vapor and may be continued by withdrawing the HCl atmosphere with its burden of water vapor and supplying more dry HCl gas. Under such conditions, employing a current of substantially dry HCl gas the reaction may be carried to completion and a product obtained comprising anhydrous magnesium chloride substantially or entirely free of basic chloride and contaminated only with unchanged impurities or product of same such as NaCl, etc., accompanying the raw materials.

The reaction will be facilitated by employing a divided form of basic salt such as a granular or crushed form thereof carrying out the treatment in a manner adapted to bring the solid and gaseous phases into intimate contact.

The reaction may be conducted by working continuously in countercurrent in a suitable vessel in which the chloride may be rolled over, or otherwise stirred to permit removal of water vapor in the gas stream and to contact the nearly finished material with the incoming dry gas. Other things being equal, the rate of reaction increases rapidly with the temperature of contacting HCl and basic chloride, or the reaction may be carried on in batches by charging a suitable vessel with a quantity of the dried product and then passing a suitable current of HCl gas through the mass thereof while heating it.

It should be noted that the total dissociation pressure reaches atmospheric pressure between 280° and 290° C. so that attempts to heat the material to a higher temperature when operating at atmospheric pressure may not increase the temperature thereof, but will increase the rate of heat input and of the diffusion of gases into and out of the solid particles of salt, thereby increasing the rate of working.

Another facilitating condition is the size and porosity of the salt particles. Since the HCl gas must reach the cores of the solid particles, and $H_2O$ vapor must be removed therefrom, large sized or non-porous particles require longer treatment than do small sized or porous particles.

Presence of air or other inert gas inhibits diffusion of the dry HCl into the cores and of the moisture laden gas out of the particles. A strong HCl gas, therefore, facilitates or increases the rate of working. As shown in the table above, the HCl gas becomes 100 per cent saturated with water vapor with respect to the reaction when the molecular ratio of $HCl/H_2O$ rises to approximately 2.34, said ratio being practically constant throughout the temperature range therein stated. Speed of reaction is thus a function of the $HCl/H_2O$ ratio in the exit gases. The greater this ratio the higher the drying head and the more rapid the rate of the reaction.

I have found that the dried oxychloride cement in crushed, screened and graded condition, passing a 12 mesh screen may be successfully treated in batches in a chamber or vessel of iron or steel into which the material is charged and through which a plurality of heating elements pass, such as tubular flues for heating the material during the treatment. By passing the hot products of combustion of fuel at a controlled temperature approximating 300° to 350° C. through such tubes and around such vessel and a current of substantially dry HCl gas through the granular mass of material in same, the rate of gas supply may be controlled to secure a practically saturated exit gas, i. e., one in which the $HCl/H_2O$ ratio is substantially as stated in the table herein. A practically anhydrous magnesium chloride product results. The temperature of the heating gas will be maintained practically constant during its contact with the vessel and flues by recirculation of same and addition of hotter products of combustion of fuel thereto to make up for heat absorption and losses.

I have found that a considerable range of composition of the plastic mixture may be used and yet produce a set product usable in my method. I have prepared mixtures such that the calculated composition of the resulting set cement ranged as per the following table.

| | Series I | Series II | Series III |
|---|---|---|---|
| $MgCl_2$ | 29.2% to 45.9% | 33.4% to 37.0% | 8.3% to 24.5%. |
| $H_2O$ | 59.7% to 51.8% | 54.4% to 60.3% | 44.8% to 50.3% |
| $MgO$ | 10.0% to 2.1% | 11.0% to 2.4% | 42.2% to 22.5%. |
| Inert from calcined magnesite. | 1.1% to 0.2% | 1.2% to 0.3% | 4.7% to 2.7%. |
| Time of set | 24 hrs. to 8 minutes. | 26 minutes to 5 hrs. | 3 hrs. to 7 hrs. |

In Series I the caustic magnesia was added to saturated magnesium chloride solutions at various temperatures, in amounts that appeared sufficient to cause coagulation, and the proportions of MgO to $MgCl_2$ were then determined from the weights used. In the second series, predetermined proportions of MgO to $MgCl_2$ were used with a hot, saturated magnesium chloride solution having a boiling point of 131° C. In the third series, the caustic magnesia was added to cold magnesium chloride solutions of 18, 27 and 36° Bé. density, at 20° C. In all cases it was possible to obtain a solid mixture of the chloride and oxide.

From observations and the data obtained, the following general conclusions may be reached:

1. In adding caustic magnesia to hot saturated magnesium chloride solutions to hasten congealing and hardening during cooling, the higher the concentration of magnesium chloride, the less the magnesite required and the shorter the time elapsing until congealing takes place.

2. With a hot saturated solution of definite magnesium chloride content, the higher the ratio of added magnesium oxide to magnesium chloride, the more rapid the rate of congealing during cooling, and the higher the temperature at which the congealing takes place.

3. Cold unsaturated solutions of magnesium chloride require the addition of much greater amounts of caustic magnesia to form solid masses than do hot saturated solutions.

4. The actual ratios of magnesium chloride to magnesium oxide in the experiments varied from 1 MgO : 0.198 $MgCl_2$ using an 18° Bé. magnesium chloride solution at 20° C. to 1 MgO : 21.6 $MgCl_2$ using a saturated, boiling solution of magnesium chloride at 154° C. Of course, with this last mentioned magnesium chloride solution still smaller proportions of MgO to $MgCl_2$ could be used and still obtain a solid since the hot magnesium chloride solution itself is equivalent to 100 per cent $MgCl_2.6H_2O$ which would form as a solid, on cooling.

The mixtures employing the larger proportions of MgO will be the most desirable for use in my method of preparing the anhydrous chloride therefrom, involving as they do less drying per unit MgO equivalent content.

I find it further advantageous to recondition the spent HCl gas, i. e., the exit gas burdened with water vapor for recirculation, by dehumidifying it and adding make-up HCl gas as required.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of preparing anhydrous magnesium chloride which comprises intermixing magnesium oxide and an aqueous magnesium chloride solution, allowing the mixture to set to a solid mass, reducing the latter to form small particles, drying the particles and subjecting the same to the action of hydrochloric acid gas at a temperature above 280° C.

2. The method of preparing anhydrous magnesium chloride which comprises intermixing magnesium oxide and an aqueous magnesium chloride solution, allowing the mixture to set to a solid mass, crushing the latter to form small particles thereof, drying the particles and heating the same in an atmosphere of hydrochloric acid at a temperature not greatly exceeding 290° C.

3. The method of preparing anhydrous magnesium chloride which comprises intermixing magnesium oxide and an aqueous magnesium chloride solution, allowing the mixture to set to a solid mass, crushing the latter to form small particles thereof, drying the particles and passing the same in countercurrent to a current of hydrochloric acid gas at a temperature sufficient to remove water from the reaction product but not greatly exceeding 290° C.

Signed by me this 30 day of March, 1929.

EDWIN O. BARSTOW.